United States Patent [19]

Nelson

[11] 4,072,185

[45] Feb. 7, 1978

[54] AIR COOLING APPARATUS FOR VERTICAL EXTRUDERS

[75] Inventor: Alden W. Nelson, West Mystic, Conn.

[73] Assignee: Crompton & Knowles Corporation, New York, N.Y.

[21] Appl. No.: 623,514

[22] Filed: Oct. 17, 1975

[51] Int. Cl.² ............................................. F25B 29/00
[52] U.S. Cl. ......................................... 165/30; 34/20; 165/48; 165/122; 425/143; 366/69
[58] Field of Search .................... 165/27, 30, 48, 121, 165/122; 123/41.58, 41.60, 41.61, 41.65; 34/20; 425/143, 144; 259/191, 185

[56] References Cited

U.S. PATENT DOCUMENTS

| 3,167,812 | 2/1965 | Von Bennigsen | 165/30 |
| 3,353,212 | 11/1967 | Nelson | 165/124 |
| 3,394,754 | 7/1968 | Schneeberg | 165/27 |
| 3,493,036 | 2/1970 | Good | 165/30 |
| 3,743,252 | 7/1973 | Schott, Jr. | 259/191 |
| 3,751,014 | 8/1973 | Waterloo | 165/30 |
| 3,781,132 | 12/1973 | Latinen | 259/191 |
| 3,799,510 | 3/1974 | Schott, Jr. | 259/191 |
| 3,866,669 | 2/1975 | Gardiner | 165/27 |
| 3,946,803 | 3/1976 | Heitzer | 165/87 |

Primary Examiner—Martin P. Schwadron
Assistant Examiner—Abraham Hershkovitz

[57] ABSTRACT

Air-cooling apparatus for a heat-exchange jacket which surrounds the outside of a vertical extruder barrel. The apparatus comprises a hood which surrounds the jacket and includes a plenum chamber at one side of the jacket, an outlet opening at the opposite side of the jacket and a restricted inlet opening between the jacket and plenum chamber wherein the hood provides a through-passage between the inlet and outlet openings. Means are provided for forcing air into the plenum chamber to create a super-atmospheric pressure therein and provide an air flow through the through-passage. The hood also includes an outlet chamber adjacent the outlet opening which has the same vertical cross-sectional configuration as the plenum chamber to provide a balanced air draft condition on opposite sides of the heat-exchange jacket.

7 Claims, 4 Drawing Figures

AIR COOLING APPARATUS FOR VERTICAL EXTRUDERS

BACKGROUND OF THE INVENTION

This invention relates generally to temperature control apparatus for extruders and more particularly to air cooling apparatus for vertical extruders.

Air cooling apparatus is generally known for horizontal extruders which have a heat-exchange jacket surrounding the extrusion cylinder. The heat-exchange jacket contains electrical heating units internally and external ring-like heat-exchange fins. Hoods are located around the fins providing passages between the fins. The hoods form a lower opening beneath the fins and an upper opening above the fins. Air is forced into the lower or inlet opening by a blower and travels past the fins via the passageways between the fins and out through the upper or outlet opening. The fins are cooled by the passing air which in turn reduces the temperature of the heat-exchange jacket.

Electrical control means, including temperature probes, measure the temperature of the extruder barrel and are effective to either actuate the electrical heating units in the heat-exchange jacket for heating or to turn on the blower for cooling. In this manner, the barrel temperature can be maintained at a desired set temperature.

An example of a temperature control apparatus for a horizontal extruder of the type described above is shown in U.S. Pat. No. 3,353,212 dated Nov. 21, 1967 in which I am a co-inventor. Although the cooling apparatus in this patent functions satisfactorily for horizontal extruders it is inadequate when applied to vertical extruders. In a horizontal extruder, the air flow is vertical due to the fact that the hood openings are located above and below the fins. The natural tendency of hot air to rise is a factor in the air flow between the lower and upper openings in the hood, particularly in maintaining an even air flow throughout the entire fin area. This natural upward air flow is even more significant when the blower is off. As the heated air from between the fins rises, cooler air will be drawn from the lower opening and will cause additional cooling of the fins.

The above described air-cooling apparatus has been found to be unsatisfactory when it is applied to a vertical extruder. Since the longitudinal axis of a vertical extruder is vertical, the opening of the hood will be aligned within a horizontal plane and the air flow from the blower or inlet opening to the opposite or outlet opening is also in this horizontal plane. The natural upward flow of air creates an uneven air flow between the fins which in turn creates unequal cooling of the fins.

SUMMARY OF THE INVENTION

It is a principal object of the present invention to provide air-cooling means for a vertical extruder which substantially eliminates the effects of natural upward drafting of hot air.

It is another object of the invention to provide equal cooling of the inlet and outlet halves of the fins during periods when the blower is active and periods when the blower is inactive.

The principal object of the invention is accomplished by providing a plenum chamber between the inlet opening and the blower and creating a super-atmospheric pressure in the plenum chamber. This condition is accomplished by providing an inlet opening which has a smaller cross-sectional area than the passageway created by the hood and fins. Since the air in the plenum chamber has a super-atmospheric pressure, the pressure and velocity of the air emerging from the inlet opening will be equal throughout the vertical length of the opening. This pressurized air will be evenly distributed into the passageway between the inlet and outlet openings and create equal cooling of the fins. The desired equal cooling effect is obtained by providing a high volume low pressure blower coupled with an inlet opening of a size which allows a high volume of air to flow between the openings and which maintains a relatively low super-atmospheric pressure in the plenum chamber. For example, for an inlet opening of 5.7 square inches, a high volume air flow of 325 cubic feet per minute and a plenum chamber pressure of between 0.036 and 0.045 P.S.I. above atmospheric provides satisfactory results.

Since the air which flows past the outlet halves of the fins has already been heated by the inlet halves of the fins, it is less effective in cooling the outlet portions of the fins. It has been found that by making the total surface area of the inlet halves of the fins between 15% and 30% less than the total surface area of the outlet halves of the fins, equal cooling occurs on the inlet and outlet halves of the jacket.

During periods when the blower is inactive a natural circulation of air is created by heated air rising vertically along the fins near the inlet opening and back through the upper portion of the plenum chamber into the blower. The rising air along the outside of the fins near the inlet opening draws air from the blower through the lower portion of the plenum chamber to complete a circular flow of air. In order to create a similar circulating air flow along the outlet side of the fins, baffles are provided adjacent the outlet openings. The baffles form an outlet chamber which has the same cross-sectional configuration as the plenum chamber within a vertical plane which extends through the center of the jacket and the center of the outlet and plenum chambers. By restricting the natural updraft of air along the outlet side of the fins to match that of the inlet side, cooling of the fins is the same for both sides when the blower is off. If there were no baffles on the outlet side, air would rise along the fins at a rapid rate and cool air would be continuously drawn up from below the fins from the atmosphere. The outlet portions of the fins would be cooled at a greater extent than the inlet portions. This would create an uneven temperature in the jacket and extruder barrel which would be detrimental to the operation of the extruder. The temperature differential would also cause the warmer side of the barrel to expand to a greater extent than the opposite side, causing the barrel to bend and create additional problems in the extruding process.

To prevent outside drafting, the pasageway within the hood must be substantially sealed from the outside atmosphere. If the hood were supported on a fixed support, there would be relative movement between the barrel and hood due to thermal expansion of the barrel.

Another feature of the invention therefore is to provide apparatus for supporting the entire cooling assembly on the jacket which eliminates the problem of relative movement between the barrel and hood.

DETAILED DESCRIPTION OF THE INVENTION

Figure 1:
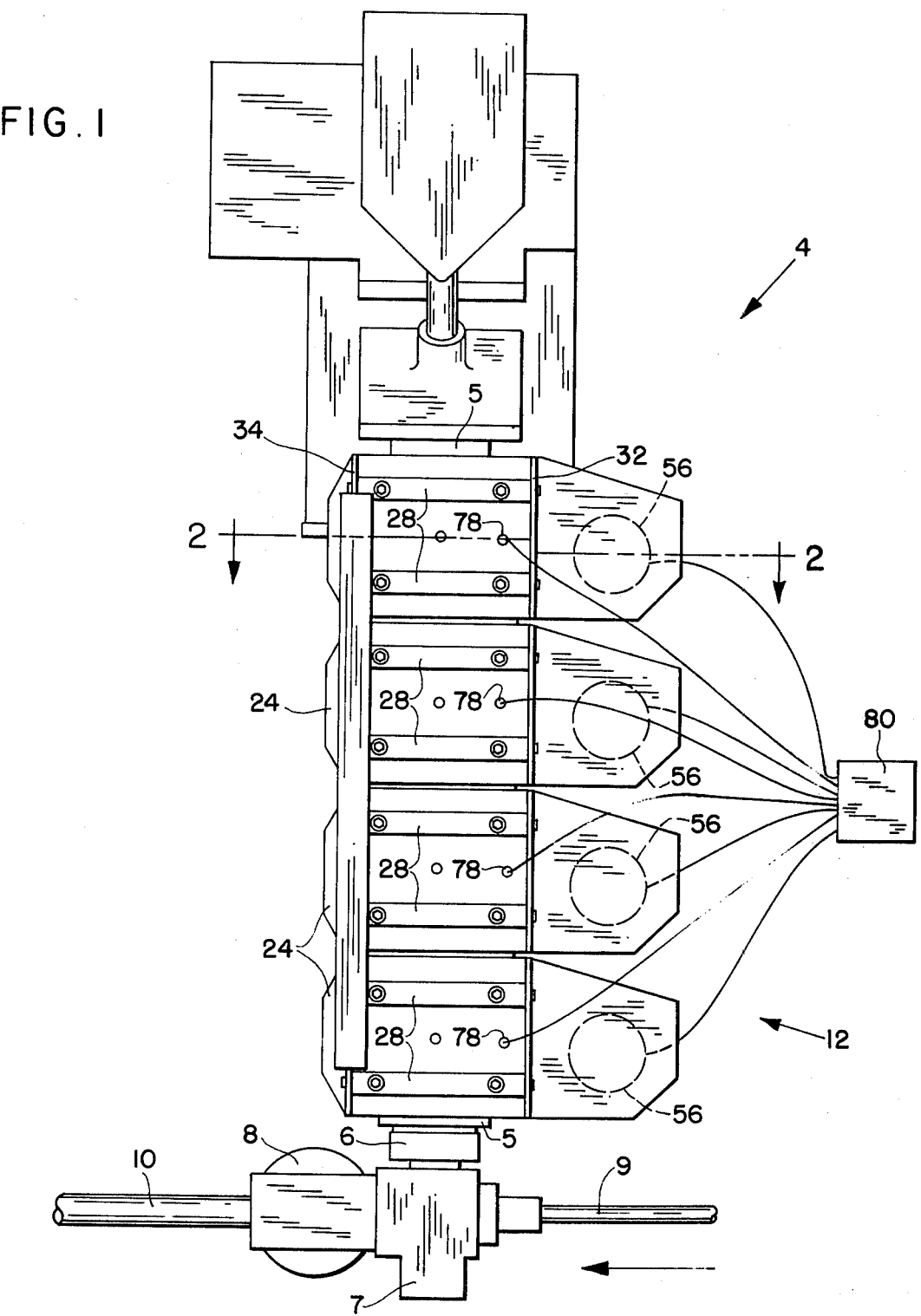
FIG. 1 is a front elevation of a vertical extruder to which the present invention is applied.

Referring to the drawings, there is shown a vertical extruder generally indicated by the reference numeral 4 and comprises a barrel 5 which has an outlet end 6 which is attached to a crosshead 7.

The outlet end of a horizontal extruder 8 is also attached to crosshead 7. A core or wire 9 to be coated enters crosshead 7 from the right as viewed in FIG. 1 and receives a first coating from extruder 4 and a second coating from extruder 8 after which it exits from the crosshead as a coated wire 10. This is only one example of many possible applications for a vertical extruder.

Barrel 5 of vertical extruder 4 is divided into separate thermal zones wherein the temperatures in each zone is kept at a set level by a temperature control unit 12. Each control unit 12 includes a heat-exchange jacket 14, see FIG. 2, which comprises two half sections which together surround the barrel. Bolts 13 extend freely through apertures 15 in the terminating ends of both half sections of jacket 14. Each bolt 13 has a pair of nuts 16 threaded thereon outside of the jacket which, when brought toward each and tightened against shoulders 17, are effective to clamp the half sections of the jacket to the barrel 5 and cause the bolts 13 to be rigidly supported on the jacket for a purpose to be described. Jacket 14 also comprises electrical heating units 19 within its interior and spaced annular fins 18 along its exterior surface. The fins 18 are effective to radiate heat from the heat-exchange jacket, particularly when air is blown across the surfaces of the fins. The fins are air cooled by air cooling means generally indicated by the reference numberal 20.

Air cooling means 20 comprises a hood which has a rigid inlet portion 22, a rigid outlet portion 24 and a flexible central portion 26. Inlet and outlet portions 22 and 24 are mounted to u-shaped brackets 28 which are in turn mounted to the extending portions of bolts 13.

Inlet portion 22 has an elongated flange 32 on each side thereof which extend along the entire vertical length of the inlet portion. Outlet portion 24 has a similar flange 34 on each side thereof which also extends along the entire vertical length of the outlet portion. Brackets 28 are fastened to flanges 32 and 34 by bolts 36 and 38, respectively, which act to pull the inlet and outlet portions toward each other against fins 18 upon tightening of bolts 36 and 38.

Figure 2:
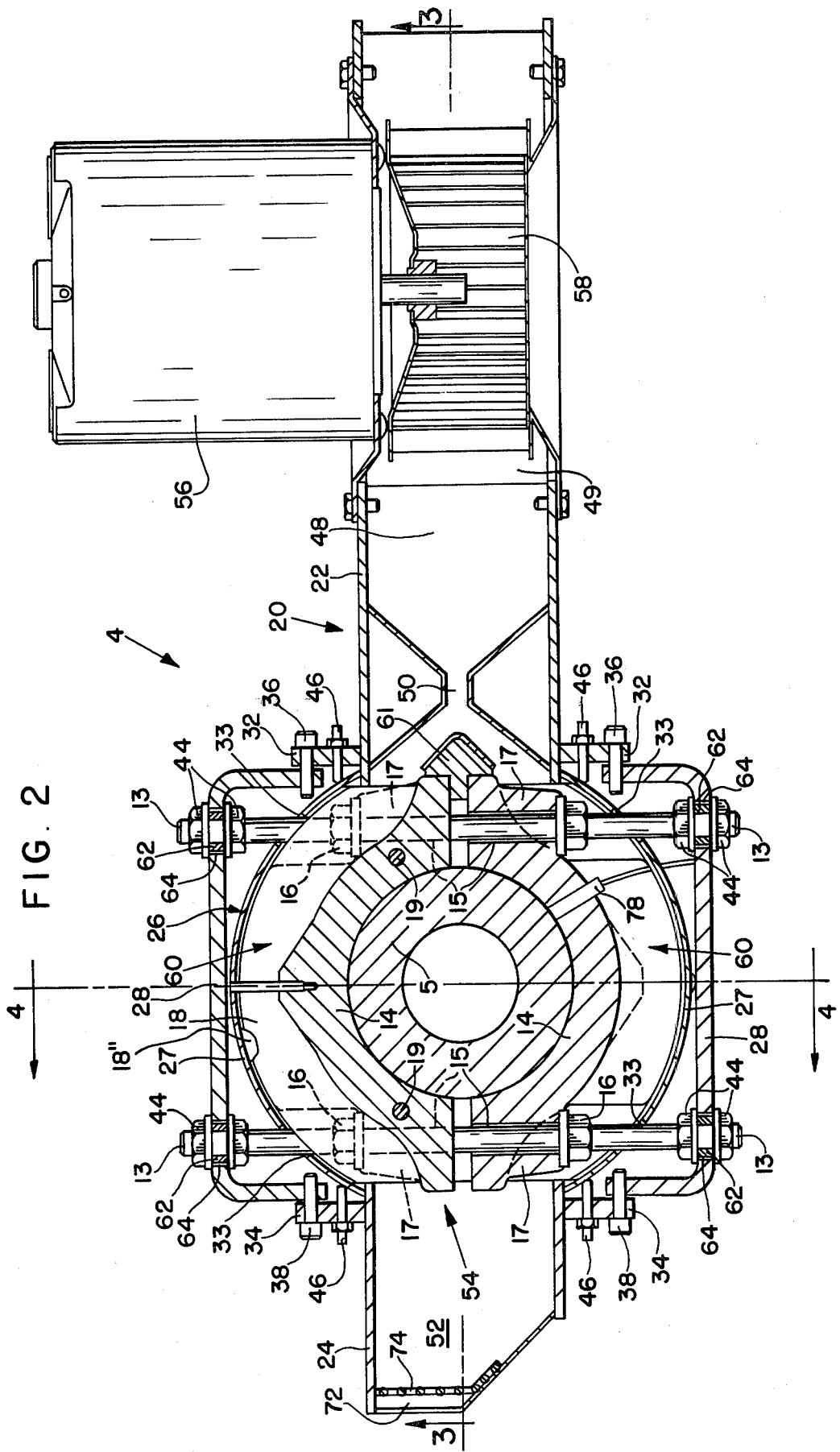
FIG. 2 is a horizontal section taken along line 2—2 of FIG. 1 and looking in the direction of the arrows.
Figure 4:
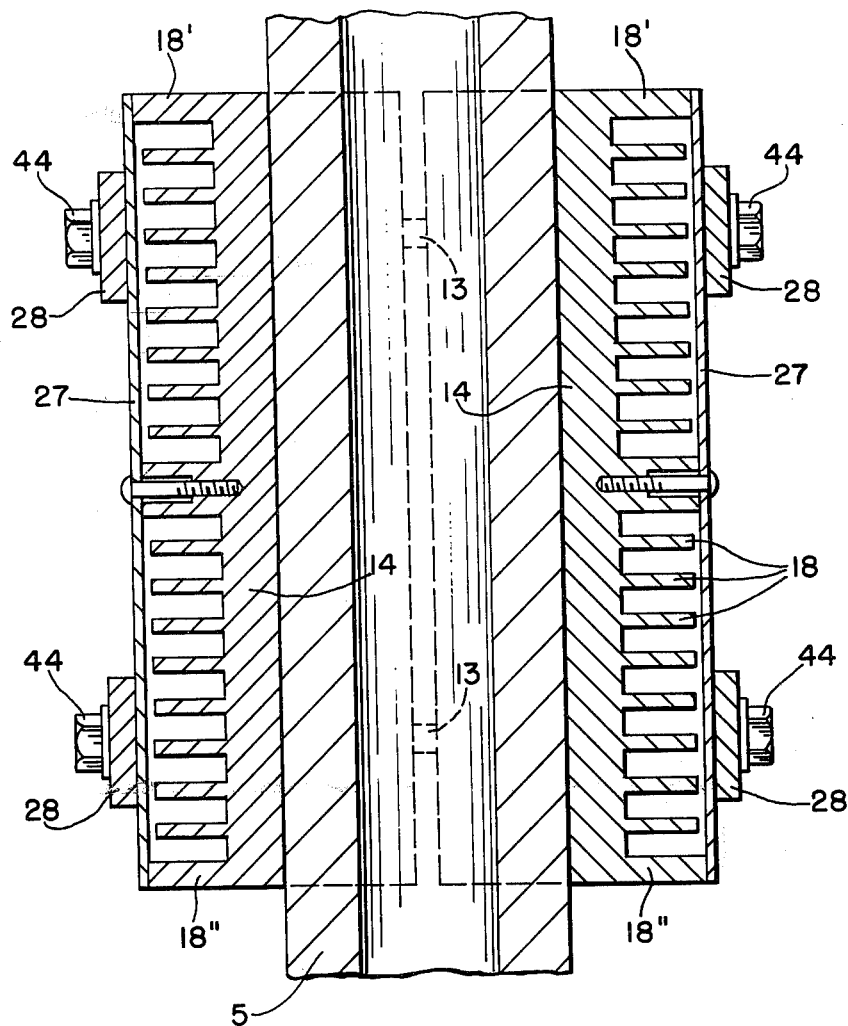
FIG. 4 is a vertical section taken along line 4—4 of FIG. 2 and looking in the direction of the arrows.

The central flexible portion 26 of the hood comprises a pair of flexible metal sheets 27 located on opposite sides of the shell 14 and which extend between inlet portion 22 and outlet portion 24. Each of the sheets 27 are bent into conformity with the outside peripheries of the uppermost and lowermost fins 18' and 18", respectively, and a few of the fins in between these two extreme fins to form a pair of air-tight shrouds as shown in FIGS. 2 and 4. The ends of each of the sheets 27 are clamped against the outside surfaces of inlet and outlet portions 22 and 24, respectively, by means of studs 46 which are threaded through flanges 34 and 32. There are holes 33 located in sheets 27 through which bolts 13 extend. The remaining fins are shorter than the fins 18' and 18" and therefore have a clearance with respect to flexible central portion 26 for a purpose to be described hereinbelow.

Inlet portion 22 contains a plenum chamber 48 an inner opening 49 and an inlet opening 50 located between the plenum chamber and the fins 18. Plenum chamber 48 and inlet opening 50 extends along the entire vertical length of the rigid inlet portion 22. Rigid outlet portion 24 contains an outlet chamber 52 and an outlet opening 54 located between chamber 52 and fins 18. Chamber 52 and outlet opening 54 extend along the entire vertical length of outlet portion 24. A blower 56 is attached to inlet portion 22 and includes a blower wheel 58 which communicates with plenum chamber 48. Blower 56 is effective to blow air into plenum chamber 48 through inner opening 49, the air then passes through inlet opening 50 and through a passageway 60 which is formed between the fins 18 and out through outlet opening 54.

Inlet opening 50 is restricted to the extent that there is a build-up of air pressure in plenum chamber 48 that slightly exceeds that of the prevailing atmospheric pressure. This causes the air within the plenum chamber 48 to pass through inlet opening 50 at an even rate throughout its entire length. This air then passes through passageway 60 between fins 18 and is effective to cool the fins. Air also passes over the outer periphery of those fins 18 which do not extend to the central portion 26. It has been found that air passing along the outer edges of the fins produces maximum cooling. A V-shaped baffle 61 is attached to jacket 14 adjacent opening 50 and extends along the entire vertical length of the opening. Baffle 61 is effective to divide the air stream from opening 50 evenly to both sides of the jacket.

As air passes along the outer surfaces of the fins it picks up heat from the fins and as the air itself becomes heated it becomes less efficient in picking up further heat. For this reason, the total fin area on the inlet half of the heat-exchange jacket has less surface area than on the outlet half of the heat-exchange jacket. The amount of difference, of course, will vary for different conditions. In the present instance, a range of 15% to 30% less fin surface area on the inlet half of the jacket than on the outlet half of the jacket has been found to be effective when using a blower producing 325 cubic feet of air per minute.

The heat-exchange jacket 14 is preferable made out of aluminum or other non-ferrous material that has a high thermal conductivity. The brackets 28 are made out of steel or other ferrous material which has a lower thermal conductivity. It is important that the jacket be made of material having a high thermal conductivity so that heat can be exchanged as rapidly as possible to and from the barrel. The choice of steel for the brackets is for structural reasons. The jacket material also has a higher coefficient of expansion than the bracket material and is hotter so that the jacket 14 will expand to a greater degree than the brackets 28. At each end of each bolt 13 there is a spacing bushing 62 which extends through an opening 64 in the bracket 28. Bushings 62 have a smaller outer diameter than openings 64 to allow for the difference in thermal expansion between the brackets and the jacket. Each of the bushings 62 has a length which exceeds the thickness of brackets 28 and act to separate pairs of nuts 44 which mount brackets 28 to bolts 13 to allow for thermal expansion of the bolts 13 along their longitudinal axes.

Figure 3:
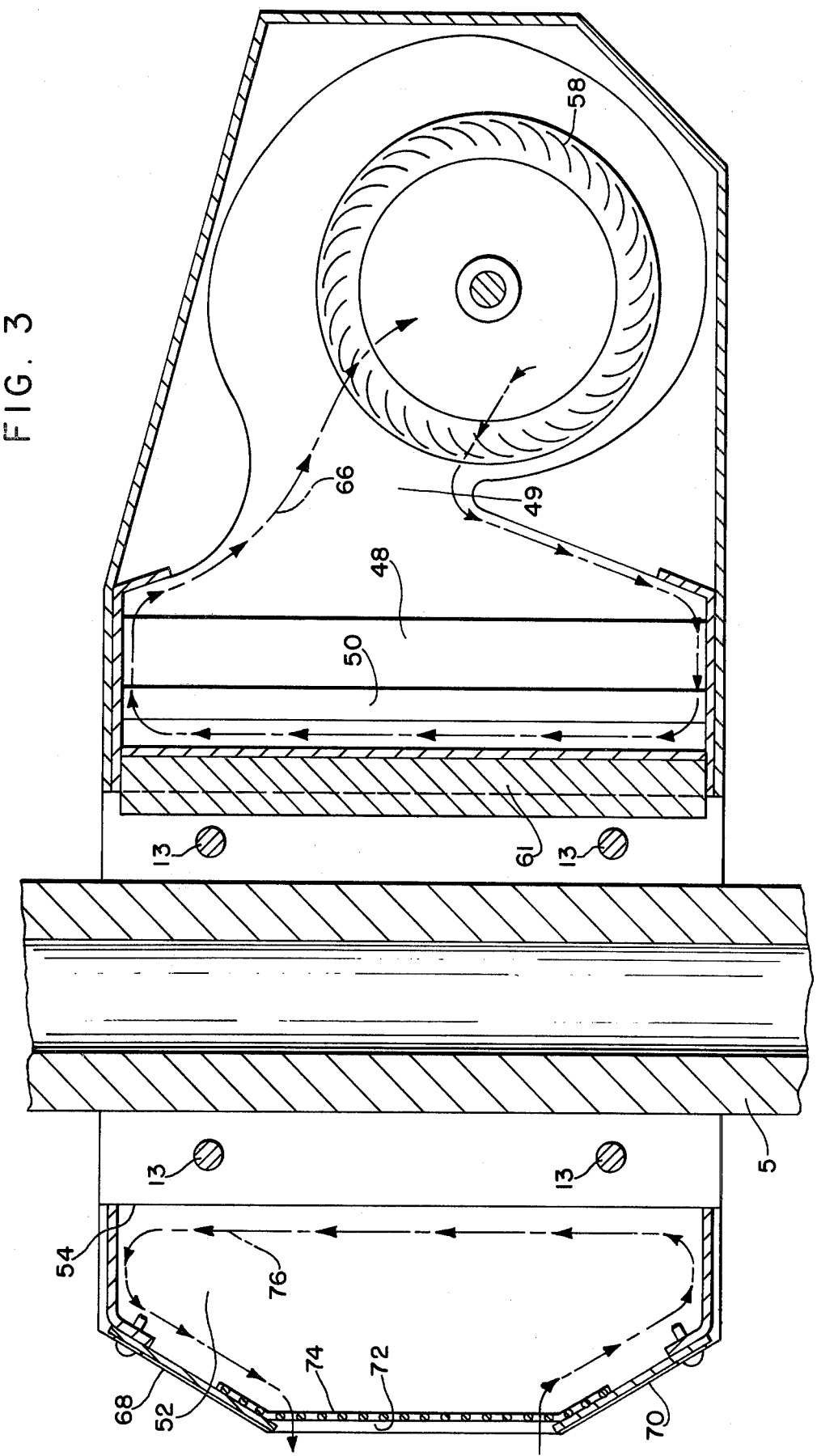
FIG. 3 is a vertical section taken along line 3—3 of FIG. 2 and looking in the direction of the arrows.

Referring particularly to FIG. 3, it can be seen that the cross-sectional shape of outlet chamber 52 is similar to plenum chamber 48 within a vertical plane which extends through the center of jacket 14 and the centers of chambers 48 and 52. During periods when the blower 56 is inactive, an air flow develops in the plenum chamber 48 which follows the circular path indicated by dot and dash lines 66 in a clockwise direction, as viewed in FIG. 3. This air flow is caused by the fact that air along the outside of the fins becomes heated and rises. Air from the blower wheel 58 flows to the bottom of the plenum chamber 48 to replace the air rising to the top of the chamber along the fins. The air rising along the outside of the fins is then deflected downwardly toward the blower wheel to complete the cycle.

The portion of the hood which forms outlet chamber 52 comprises upper and lower baffles 68 and 70, respectively, which converge outwardly from the jacket 14 and terminate to form an outer opening 72. An air permeable member, or screen, 74 is fastened to the outer ends of baffles 68 and 70 and extends across the opening 72. During periods when blower 56 is inactive, air which is adjacent the fins 18 is heated by the fins and rises. This rising air is deflected by upper baffle 68 through opening 72 into the atmosphere. Cooler air from the atmosphere enters through opening 72 and is guided by lower baffle 70 down to the lower portion of the outlet chamber 52 to replace the heated air rising to the top of the chamber along the outer surfaces of the fins 18. The circulation of air within outlet chamber 52 follows a path indicated by dot and dash lines 76 in a counterclockwise direction. This air flow path is similar, but of opposite hand, to that indicated by dot and dash lines 66 in plenum chamber 48. The rate of air flow in the chambers 48 and 52 is also the same. Since the air flow in plenum chamber 48 and outlet chamber 52 is the same, both sides of the jacket 14 are cooled evenly during periods when the blower is inactive.

Control means for selectively activating the heating units 16 and the blower 56 may be of any well-known type which include thermocouples or temperature probes for sensing either or both the extruder barrel temperature and jacket temperature and electrical elements operatively connected to the thermocouples. Referring to FIG. 2, a temperature probe 78 is positioned in each jacket 14 for sensing the temperature of the barrel 5 and is connected to a control unit 80, see FIG. 1. If desired, probe 78 may be placed near opening 54 so that it may be more easily removable by simply removing screen 74. unit 80 is electrically connected to probes 78 and blowers 56 for selectively controlling the probes 78 and blowers 56 in accordance with the temperatures sensed by probes 78. An example of a control means applicable to the present invention is shown in U.S. Pat. No. 3,866,669 to Robert A. Gardiner dated 29 Nov. 1973.

I claim:

1. In extrusion apparatus having an extruder barrel, the central longitudinal axis of which is vertical and an annular heat-exchange jacket surrounding the outside of said barrel and comprising heat-exchange fins on its outer periphery lying in spaced parallel planes substantially normal to said axis, wherein the uppermost and lowermost of said fins extend further from said axis than the remaining fins, air cooling means for said jacket comprising:
   (a) a hood supported on and surrounding said jacket and comprising:
      (1) an inlet portion at one side of said jacket which contains a plenum chamber and an inlet opening between said jacket and said plenum chamber and which extends along the length of said jacket, the horizontal dimension of said inlet opening being substantially less than that of said plenum chamber;
      (2) an outlet portion at the opposite side of said jacket which contains an outlet chamber and an outlet opening between said jacket and said outlet chamber and extending along the length of said jacket; and
      (3) a central portion connecting said inlet and outlet portions and being in abutting contact with the outermost of said heat-exchange fins to provide a continuous passage between said inlet and outlet openings; and
   (b) means for forcing air into said plenum chamber to create a super-atmospheric pressure therein sufficient for providing a uniform flow of air past said heat exchange fins from one end of the heat-exchange jacket to the other.

2. In extrusion apparatus as set forth in claim 1 wherein some of said remaining fins extend from said central longitudinal axis to the same extent as said uppermost and lowermost fins and are also in abutting contact with said central hood portion.

3. In extrusion apparatus as set forth in claim 1 wherein the means for supporting said inlet and outlet portions comprise:
   (a) at least one first elongated bracket located on one side of said hood;
   (b) at least one second elongated bracket located on the opposite side of said hood from said first bracket;
   (c) means for fastening one end of each of said first and second brackets to said inlet portion and the opposite ends of said first and second brackets to said outlet portion; and
   (d) elongated tie rods which are fastened to said jacket and extend outwardly for supporting said first and second brackets.

4. In extrusion apparatus as set forth in claim 3 wherein said brackets are of a ferrous material and said jacket is of a material having a higher degree of thermal expansion than said brackets and said brackets are loosely mounted on said tie rods to allow for differential expansion of said jacket and said brackets.

5. In extrusion apparatus having an extruder barrel, the longitudinal axis of which is vertical and an annular heat-exchange jacket surrounding the outside of said barrel and comprising heat-exchange fins on its outer periphery lying in spaced parallel planes substantially normal to said axis, air cooling means for said jacket comprising:
   (a) a hood supported on and surrounding said jacket and comprising:
      (1) an inlet portion at one side of said jacket including a plenum chamber and inlet opening between said jacket and said plenum chamber and which extends substantially the length of said jacket, said plenum chamber having an inner opening in the vertical side opposite from said inlet opening and having continuous walls which extend at least from said inlet opening to said inner opening, the vertical dimension of said inner opening being substantially less than that of said plenum chamber;

(2) an outlet portion at the opposite side of said jacket which contains an outlet chamber which extends substantially the length of said jacket and which has an outer opening in one of its vertical sides which is remote from said jacket, the vertical dimension of said outer opening being substantially less than that of said outlet chamber; and (3) a central portion having walls which connect said inlet and outlet portions and provide a passageway for directing air past said heat-exchange fins, wherein said outlet portion and said inlet portion have a configuration which give substantially identical air flow patterns when air is not being forced through said passageway and about said heat exchange fins;

(B) means for forcing air into said plenum chamber to create a super-atmospheric pressure therein sufficient for providing a uniform flow of air past said heat-exchange fins from one end of the heat-exchange jacket to the other.

6. In extrusion apparatus having an extruder barrel, the central longitudinal axis of which is vertical and an annular heat-exchange jacket surrounding the outside of said barrel and comprising heat-exchange fins on its outer periphery lying in spaced parallel planes substantially normal to said axis, air cooling means for said jacket comprising:

(a) a hood supported on and surrounding said jacket and having a plenum chamber at one side of said jacket, an outlet opening at the opposite side of said jacket and an inlet opening between said jacket and said plenum chamber which extends along the length of said jacket, said hood having a central portion which cooperates with said fins and said jacket to form a passageway connecting said inlet and outlet openings, wherein the vertical cross sectional area of said inlet opening is between 15% and 25% of the vertical cross sectional area of said passageway and is substantially less than that of said plenum chamber; and (b) means for forcing air into said plenum chamber to create a super-atmospheric pressure therein which is sufficient for providing a uniform flow of air through said passageway from said inlet opening to said outlet opening.

7. In extrusion apparatus having an extruder barrel, the central longitudinal axis of which is vertical and an annular heat-exchange jacket surrounding the outside of said barrel, air cooling means of said jacket comprising:

(a) heat exchange fins on outer periphery of said barrel which lie in spaced parallel planes substantially normal to said central longitudinal axis, the total fin surface area on the inlet half of said jacket being between 15% and 30% less than the total fin surface area on the outlet half of said jacket;

(b) a hood supported on and surrounding said jacket and having a plenum chamber at one side of said jacket, an outlet opening at the opposite side of said jacket and an inlet opening between said jacket and said plenum chamber which extends along the length of said jacket the horizontal dimension of the inlet opening being substantially less than that of said plenum chamber, said hood having a central portion which cooperates with said fins and said jacket to form a passageway connecting said inlet and outlet openings; and (c) means for forcing air into said plenum chamber to create a super-atmospheric pressure therein which is sufficient to provide a uniform flow of air through said passageway from said inlet opening to said outlet opening.

* * * * *